United States Patent
Evans (10) Patent No.: US 10,146,602 B2
(45) Date of Patent: Dec. 4, 2018

(54) TERMINATION OF STALLED TRANSACTIONS RELATING TO DEVICES OVERSEEN BY A GUEST SYSTEM IN A HOST-GUEST VIRTUALIZED SYSTEM

(71) Applicant: ARM LIMITED, Cambridge (GB)

(72) Inventor: Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 15/054,567

(22) Filed: Feb. 26, 2016

(65) Prior Publication Data

US 2016/0259680 A1 Sep. 8, 2016

(30) Foreign Application Priority Data

Mar. 2, 2015 (GB) .................................. 1503504.1

(51) Int. Cl.
*G06F 11/07* (2006.01)
*G06F 12/10* (2016.01)
*G06F 9/455* (2018.01)
*G06F 12/109* (2016.01)

(52) U.S. Cl.
CPC ........ *G06F 11/073* (2013.01); *G06F 11/0766* (2013.01); *G06F 11/0784* (2013.01); *G06F 11/0793* (2013.01); *G06F 12/10* (2013.01); *G06F 12/109* (2013.01); *G06F 9/45533* (2013.01); *G06F 9/45558* (2013.01); *G06F 2009/45583* (2013.01); *G06F 2212/1008* (2013.01); *G06F 2212/152* (2013.01); *G06F 2212/65* (2013.01); *G06F 2212/68* (2013.01)

(58) Field of Classification Search
None
See application file for complete search history.

(56) References Cited

U.S. PATENT DOCUMENTS

| 7,487,327 | B1 | 2/2009 | Chang et al. |
| 8,307,191 | B1 | 11/2012 | Jain |
| 8,898,430 | B2 * | 11/2014 | Chakrala ............. G06F 12/0891 711/144 |
| 2003/0236962 | A1 | 12/2003 | Venkatraman |

(Continued)

OTHER PUBLICATIONS

U.S. Appl. No. 15/054,866, filed Feb. 26, 2016, Inventor: Evans et al.

(Continued)

*Primary Examiner* — Qing Yuan Wu
(74) *Attorney, Agent, or Firm* — Nixon & Vanderhye P.C.

(57) ABSTRACT

A host data processing system provides a virtual operating environment for a guest data processing system. A transaction is initiated for translation of a guest system memory address to a host system physical address in response to a transaction request from a device overseen by a guest system. For a stalled transaction incurring an error, the following are performed: (i) storing identification information relating to that transaction including data identifying the requesting device; (ii) providing translation error condition information to the overseeing guest system; and (iii) deferring handling of the stalled transaction until a subsequent command is received from that guest system. Initiation of a closure process for a guest system initiates cancellation of certain stalled transactions.

10 Claims, 7 Drawing Sheets

(56) References Cited

U.S. PATENT DOCUMENTS

| | | |
|---|---|---|
| 2006/0075285 A1 | 4/2006 | Madukkarumukumana et al. |
| 2008/0288238 A1 | 11/2008 | Heller, Jr. |
| 2009/0043985 A1 | 2/2009 | Tuuk |
| 2011/0004708 A1 | 1/2011 | Kondo |
| 2011/0004791 A1 | 1/2011 | Kokubu |
| 2014/0101361 A1 | 4/2014 | Gschwind |
| 2014/0101362 A1 | 4/2014 | Gschwind |
| 2014/0101365 A1 | 4/2014 | Gschwind |
| 2014/0101406 A1 | 4/2014 | Gschwind |
| 2014/0156949 A1 | 6/2014 | Chakrala et al. |
| 2015/0052329 A1 | 2/2015 | Fujinami |
| 2015/0089147 A1 | 3/2015 | Snyder, II |
| 2016/0147592 A1 | 5/2016 | Guddeti |

OTHER PUBLICATIONS

Search Report for GB 1503505.8 dated Sep. 4, 2015 (3 pages).
Search Report for GB 1503504.1, dated Sep. 1, 2015, 4 pages.
Notice of Allowance dated Jun. 18, 2018 in co-pending U.S. Appl. No. 15/054,866, 10 pages.

* cited by examiner

TERMINATION OF STALLED TRANSACTIONS RELATING TO DEVICES OVERSEEN BY A GUEST SYSTEM IN A HOST-GUEST VIRTUALIZED SYSTEM

This application claims priority to GB Patent Application No. 1503504.1 filed 2 Mar. 2015, the entire content of which is hereby incorporated by reference.

BACKGROUND

This disclosure relates to memory management.

Memory management units (MMUs) attend to the translation of virtual memory addresses into physical memory addresses.

A data processing apparatus typically provides each running program with access to a virtual address space defined by virtual memory addresses. Each program sees its own virtual address space which contains instructions and data for use by that program. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory.

A cache known as a translation lookaside buffer (TLB) may be used as part of the address translation process. The TLB stores recently or commonly used translations between virtual and physical memory addresses. So, as a first step in an address translation process, the TLB is consulted to detect whether the TLB already contains the required address translation. If not, then a more involved translation process may be used, for example involving consulting so-called page tables holding address translation information, typically resulting in the TLB being populated with the required translation.

Multiple stage MMUs are used in some situations. In this arrangement, two levels of translation are in fact used. A virtual address (VA) required by an executing program or other system module such as a graphics processing unit (GPU) is translated to an intermediate physical address (IPA) by a first MMU stage. The IPA is translated to a physical address (PA) by a second MMU stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

SUMMARY

In an example arrangement there is provided a method of operation of a host data processing system which provides a virtual operating environment for one or more guest data processing systems, the method comprising:
  initiating a transaction for translation of a guest system memory address to a host system physical address in response to a transaction request from a device overseen by a guest system for access to system memory according to that guest system memory address;
  storing identification information relating to each transaction including at least data identifying the device which requested the transaction;
  for a stalled transaction, being a transaction incurring an error condition which is potentially resolvable by the guest system overseeing the device which requested the transaction:
    (i) storing identification information relating to that transaction including at least data identifying the device which requested the transaction;
    (ii) providing information indicative of the translation error condition to the guest system overseeing the device which requested the transaction; and
    (iii) deferring continued handling of the stalled transaction until a subsequent command is received from that guest system relating to the stalled transaction;
  detecting initiation of a closure process relating to a guest system; and
  in response to initiation of the closure process, initiating cancellation of any currently stalled transactions for devices overseen by that guest system for which a command has not yet been received from that guest system.

In another example arrangement there is provided host data processing system configured to provide a virtual operating environment for one or more guest data processing systems, the host data processing system comprising:
  a memory management unit configured to initiate a transaction for translation of a guest system memory address to a host system physical address in response to a transaction request from a device overseen by a guest system for access to system memory according to that guest system memory address;
  a transaction buffer configured to store identification information relating to each transaction including at least data identifying the device which requested the transaction;
  error handling logic configured, for a stalled transaction, being a transaction incurring an error condition which is potentially resolvable by the guest system overseeing the device which requested the transaction, to:
    (i) store identification information relating to that transaction including at least data identifying the device which requested the transaction;
    (ii) provide information indicative of the translation error condition to the guest system overseeing the device which requested the transaction; and
    (iii) defer continued handling of the stalled transaction until a subsequent command is received from that guest system relating to the stalled transaction;
  a detector configured to detect initiation of a closure process relating to a guest system; and
  cancellation logic, responsive to initiation of the closure process, configured to initiate cancellation of any currently stalled transactions for devices overseen by that guest system for which a command has not yet been received from that guest system.

In another example arrangement there is provided a host data processing system operable to provide a virtual operating environment for one or more guest data processing systems, the host data processing system comprising:
  means for initiating a transaction for translation of a guest system memory address to a host system physical address in response to a transaction request from a device overseen by a guest system for access to system memory according to that guest system memory address;

means for storing identification information relating to each transaction including at least data identifying the device which requested the transaction;

means operable in respect of a stalled transaction, being a transaction incurring an error condition which is potentially resolvable by the guest system overseeing the device which requested the transaction, for:
  (i) storing identification information relating to that transaction including at least data identifying the device which requested the transaction;
  (ii) providing information indicative of the translation error condition to the guest system overseeing the device which requested the transaction; and
  (iii) deferring continued handling of the stalled transaction until a subsequent command is received from that guest system relating to the stalled transaction;

means for detecting initiation of a closure process relating to a guest system; and means, responsive to initiation of the closure process, for initiating cancellation of any currently stalled transactions for devices overseen by that guest system for which a command has not yet been received from that guest system.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides a method of operation of a host data processing system which provides a virtual operating environment for one or more guest data processing systems, the method comprising:
  initiating a transaction for translation of a guest system memory address to a host system physical address in response to a transaction request from a device overseen by a guest system for access to system memory according to that guest system memory address;
  storing identification information relating to each transaction including at least data identifying the device which requested the transaction;
  for a stalled transaction, being a transaction incurring an error condition which is potentially resolvable by the guest system overseeing the device which requested the transaction:
    (i) storing identification information relating to that transaction including at least data identifying the device which requested the transaction;
    (ii) providing information indicative of the translation error condition to the guest system overseeing the device which requested the transaction; and
    (iii) deferring continued handling of the stalled transaction until a subsequent command is received from that guest system relating to the stalled transaction;
  detecting initiation of a closure process relating to a guest system; and
  in response to initiation of the closure process, initiating cancellation of any currently stalled transactions for devices overseen by that guest system for which a command has not yet been received from that guest system.

Example embodiments provide a process that terminates (or causes to be set to terminate) all outstanding stalled transactions relating to devices overseen by a given guest system in a host-guest virtualized system, whether or not they have been recorded to software and without having to know the details of which individual stalls might be present. This means a hypervisor has no requirement to track individual outstanding stalls, as they do not need to be individually matched to an individual terminate command. This can simplify clean-up after VM shutdown with assigned devices (a safety/isolation-critical path). To avoid newly received transactions joining the transaction handling arrangement and becoming stalled during a clean-up process, in example embodiments, prior to cancelling any currently stalled transactions, the step is performed of: setting a termination rule to terminate any transactions newly received by the host system from one or more devices overseen by that guest system. Similarly, to inhibit the addition of new transactions to the system for that guest system, in example embodiments prior to cancelling any currently stalled transactions, the step is performed of: inhibiting one or more devices overseen by the guest system from issuing any further transactions.

To provide handling of any non-stalled transactions still being processed, example embodiments provide the step of: in response to initiation of the closure process, instructing one or more devices overseen by the guest system to wait for a response to any outstanding transactions.

Rather than just initiating cancellation, in example embodiments the step of initiating cancellation comprises cancelling any currently stalled transactions for devices overseen by that guest system for which a command has not yet been received from that guest system.

Initiating cancellation can conveniently be carried out by reference to a stream ID or similar identifier, in which case in example embodiments the step of initiating cancellation comprises: detecting any currently stalled transactions which have stored identification information corresponding to a device overseen by the guest system which a closure process has been initiated; and initiating cancellation of all of the detected transactions.

In example embodiments the closure process comprises any one of:
- the host system causing closure of the guest system;
- the guest system closing; and
- the guest system suffering an operational failure.

In example embodiments the deferring step comprises deferring continued handling of the stalled transaction until a subsequent command is received from a guest system and that command is validated by comparing the identity of the device providing the command with the stored identification information relating to that transaction.

An example embodiment provides a host data processing system configured to provide a virtual operating environment for one or more guest data processing systems, the host data processing system comprising:
- a memory management unit configured to initiate or handle a transaction for translation of a guest system memory address to a host system physical address in response to a transaction request from a device overseen by a guest system for access to system memory according to that guest system memory address;
- a transaction buffer configured to store identification information relating to each transaction including at least data identifying the device which requested the transaction;
- error handling logic configured, for a stalled transaction, being a transaction incurring an error condition which is potentially resolvable by the guest system overseeing the device which requested the transaction, to:
  - (i) store identification information relating to that transaction including at least data identifying the device which requested the transaction;
  - (ii) provide information indicative of the translation error condition to the guest system overseeing the device which requested the transaction; and
  - (iii) defer continued handling of the stalled transaction until a subsequent command is received from that guest system relating to the stalled transaction;
- a detector configured to detect initiation of a closure process relating to a guest system; and
- cancellation logic, responsive to initiation of the closure process, configured to initiate cancellation of any currently stalled transactions for devices overseen by that guest system for which a command has not yet been received from that guest system.

An example embodiment provides a host data processing system operable to provide a virtual operating environment for one or more guest data processing systems, the host data processing system comprising:
- means for initiating a transaction for translation of a guest system memory address to a host system physical address in response to a transaction request from a device overseen by a guest system for access to system memory according to that guest system memory address;
- means for storing identification information relating to each transaction including at least data identifying the device which requested the transaction;
- means operable in respect of a stalled transaction, being a transaction incurring an error condition which is potentially resolvable by the guest system overseeing the device which requested the transaction, for:
  - (i) storing identification information relating to that transaction including at least data identifying the device which requested the transaction;
  - (ii) providing information indicative of the translation error condition to the guest system overseeing the device which requested the transaction; and
  - (iii) deferring continued handling of the stalled transaction until a subsequent command is received from that guest system relating to the stalled transaction;
- means for detecting initiation of a closure process relating to a guest system; and
- means, responsive to initiation of the closure process, for initiating cancellation of any currently stalled transactions for devices overseen by that guest system for which a command has not yet been received from that guest system.

Figure 1:
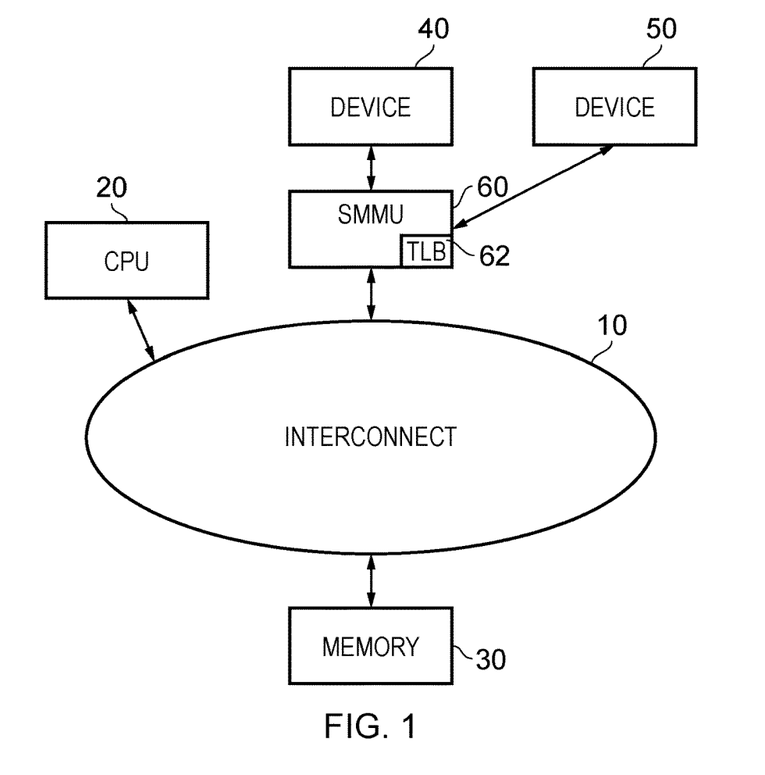
FIG. 1 is a schematic diagram of a data processing arrangement in a virtualized environment.

Referring now to the accompanying drawings, FIG. 1 is a schematic diagram of a data processing arrangement in a virtualized environment. In FIG. 1, various units are connected via an interconnect arrangement 10. The units connected via the interconnect arrangement 10 include: a central processing unit (CPU) 20, a system memory 30 (optionally having associated cache memory, not shown), one or more devices 40, 50 and a system memory management unit (SMMU) 60 including a translation lookaside buffer (TLB) 62.

The devices are, in this example, peripheral user interface or data input/output devices such as a camera device. Each of the devices 40, 50 is associated with a virtual machine (VM) or guest system in a virtual environment. The device(s) are referred to as being overseen by the respective VM, which is to say that (for example) they operate under an operating system running in the VM, and they have access to a virtual memory space provided for or by the VM. The apparatus of FIG. 1 provides the devices with access to a virtual address space defined by virtual memory addresses. Each virtual machine sees its own virtual address space which contains instructions and data for use by that virtual machine. Amongst other advantages, the use of virtual addressing allows a host operating system or hypervisor (HV) to control memory access by inhibiting one virtual machine from accessing or corrupting information used by another virtual machine. FIG. 1 provides an example of such an arrangement in which a host data processing system provides a virtual operating environment for one or more guest data processing systems.

The system memory is addressed by physical addresses. Therefore when a device requires access to a virtual memory address, for example to read or to write either an instruction or a data item, it is first necessary to translate the virtual memory address to a physical memory address so that the required information can be obtained from or written to the system memory 30. The translation of memory addresses is carried out by the SMMU 60. More details will be given of the SMMU operation below.

The TLB 62 provides a caching function in the memory address translation process. The TLB 62 stores recently or commonly used translations between virtual and physical memory addresses. So, as a first step in an address translation process, the TLB 62 is consulted in order to detect whether the TLB already contains the required address translation. If not, then a more involved translation process may be used, for example involving consulting so-called page tables holding address translation information, typically resulting in the TLB 62 then being populated with details of the required translation.

The virtualized system of FIG. 1 makes use of multiple stage address translation. In this arrangement, two levels of translation are in fact used. A virtual address (VA) required by an executing program or other system module in one of the devices 40 is translated to an intermediate physical address (IPA) by a first MMU stage. As far as the VM software is aware, the IPA is a physical address used to access the system memory. However, the virtualized system provides a second level of address translation such that the IPA is then translated to a physical address (PA) by a second memory management unit stage. The IPA to PA translation is wholly under the control of the hypervisor. So, a particular VM may be exposed to the VA to IPA translation, whereas only the hypervisor has oversight of the IPA to PA translations and therefore control of real accesses to the physical system memory. But from the point of view of the VM, the IPA is a real address relating to the required memory access.

In some examples, each device 40, 50 may be associated with a respective virtual machine. In other examples, multiple devices may be associated with a single virtual machine. In terms of communication between the devices and the SMMU 60, the devices may each be associated with a respective "stream" identifier (stream ID) which, among other functions, can assist with routing SMMU transactions to and from the devices. The stream ID therefore acts as a device identifier.

FIG. 1 shows the use of one SMMU 60. In other examples, such as that shown in FIG. 2, the memory management unit functionality may be, in part, distributed in that TLBs may be respectively associated with each device, so that translation takes place locally to the device but, in the case of a required translation not being found in the respective TLB (a TLB "miss") reference is made to a central MMU for resolution of the required translation. However, for the purposes of the discussion which follows, either arrangement is applicable.

Figure 2:
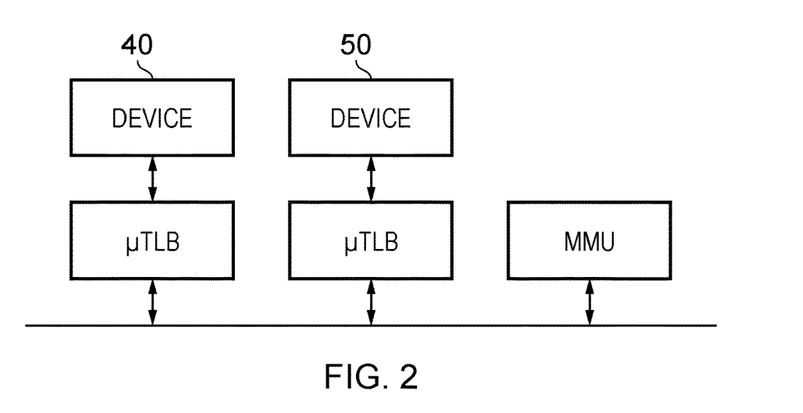
FIG. 2 schematically illustrates a distributed memory management function.

Note also that FIGS. 1 and 2 are schematic illustrations of the physical structure of the data processing arrangement. The logical structure is discussed below in respect of one or more VMs and a HV. The VMs and the HV exist as different software processes running on the CPU 20, for example with different respective levels of operating privilege. So, a common CPU, running different respective software (which may be stored in the system memory 30), can provide the functionality of the VM(s) and the HV.

Figure 3:
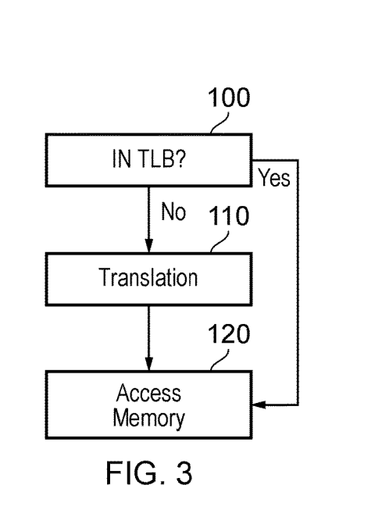
FIG. 3 is a schematic flowchart of an address translation process.

FIG. 3 is a schematic flow chart illustrating, at a high level, an address translation operation.

At a step 100, a detection as to whether a required translation is held by the TLB 62. If the answer is yes then control passes to a step 120 to be discussed below. If the answer is no, then control passes to a step 110 at which a translation of that memory address is obtained by the SMMU 60. Control then passes to the step 120 at which the required memory address in the system memory 30 is accessed using the PA corresponding to the initial VA provided by the device in question.

Figure 4:
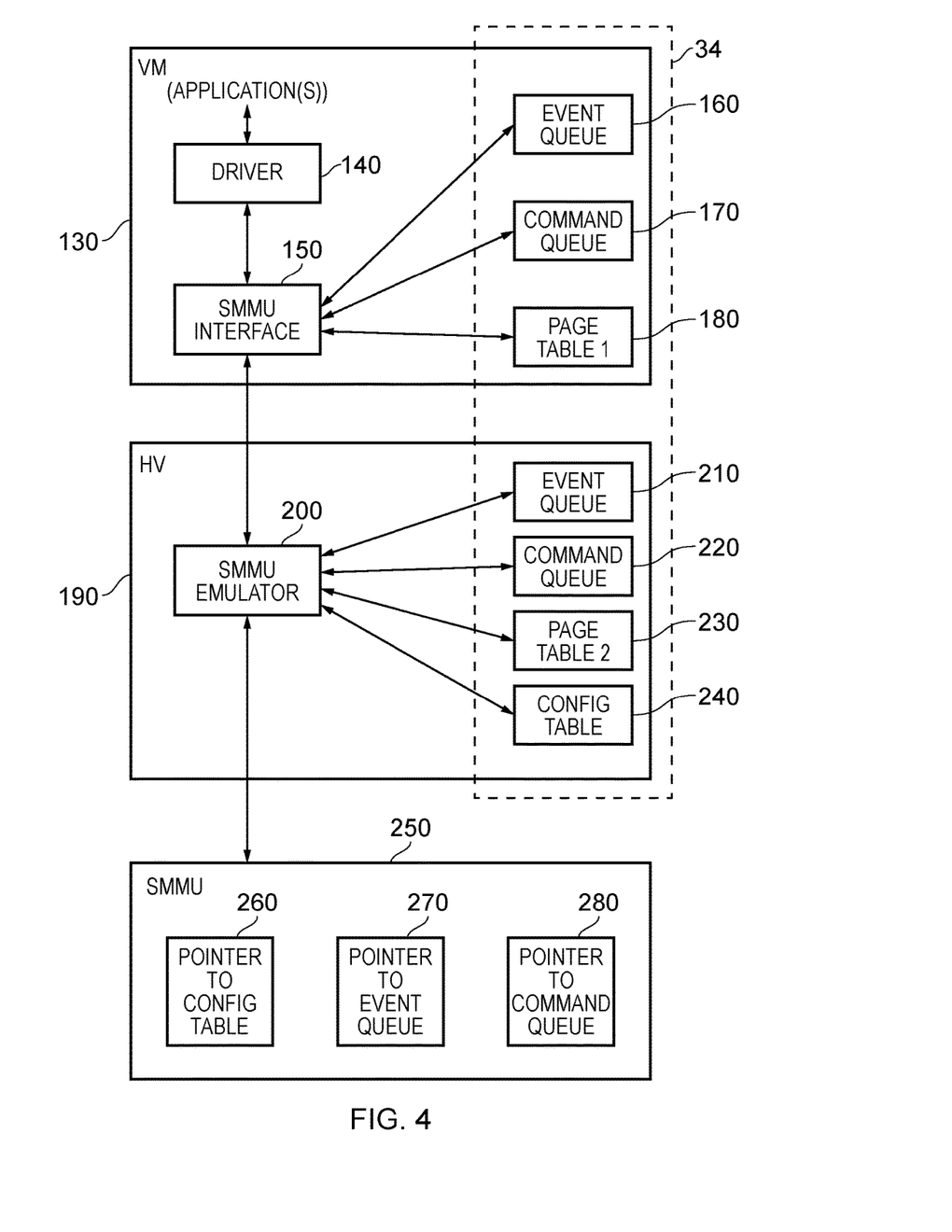
FIG. 4 is a schematic diagram of a host and guest system.

FIG. 4 schematically illustrates the interaction of a virtual machine, a hypervisor and an SMMU at a logical level.

As mentioned above, a VM 130 may be associated with one or more devices 40, 50. One or more VMs may be overseen by the HV 190. Just one VM is shown in FIG. 4 for clarity.

The VM 130 comprises driver software 140 which interacts with an SMMU interface 150, which will be described in more detail below. The SMMU interface 150 interacts with an event queue 160, a command queue 170 and a stage 1 page table 180. A new entry in the event queue 160 is associated with an interrupt issued so as to prompt particular software action by the VM 130. The interrupt may be initiated by the agent which adds an entry to the queue.

The event queue 160, the command queue 170 and the stage 1 page table 180 are under "ownership" or oversight of the VM 130 but are in fact stored in system memory. In the notation of FIG. 4, items stored in system memory are drawn within a broken line box 34. However, the ownership of those items is indicated by whether they are drawn within the solid line boxes corresponding to the VM or the HV.

The HV 190 comprises an SMMU emulator 200, which will be discussed in more detail below, and which interacts with an event queue 210, a command queue 220, a stage 2 page table 230 and a configuration table 240. The SMMU emulator 200 also interacts with the SMMU interface 150 of the VM.

The HV 190 also interfaces with the SMMU 250, which makes use of established two-stage SMMU capabilities and comprises (in one or more registers) a pointer 260 to the memory location of the configuration table 240, a pointer 270 to the memory location of the event queue 210 and a pointer 280 to the memory location of the command queue 220.

The VM and the HV represent respective software processes running on the CPU 20. One difference between them (apart from differences in their purpose and functionality) is the privilege level at which the instructions are executed for the VM and the HV processes. The HV processes are executed at a higher privilege level, where "privilege" is used here in the sense of a reference to type and scope of operations which can be performed at different privilege levels. Generally, a higher privilege level allows a greater scope and/or a wider type of operations to be performed. An operating system (OS) would often be expected to run at a higher privilege level than an application program, and a hypervisor would often be expected to run at a higher privilege level than an OS overseen by the hypervisor, which then allows a hypervisor to run potentially multiple OSs beneath it as VMs, with the multiple VMs sharing the resources of the system by using (amongst potentially other techniques) virtual addressing. For this reason the HV can be referred to as the "host" system and the VMs as "guest" systems.

The physical SMMU 250 (shown in FIG. 1 as the SMMU 60) is not in fact made directly available to the guest systems in the present example arrangements. But in order to provide an environment for which VMs can be written and executed, the VM 130 needs to be provided with an SMMU interface which, from the point of view of software executing in the VM 130, appears to be an SMMU. To achieve these joint aims, the HV 190 provides an emulation 200 of some of the functionality of the SMMU, the emulation 200 including an emulated SMMU interface 150. Note that the emulated interface 150 does not in fact have to be an emulation of the actual interface to the physical SMMU 250, but can be a generic or other SMMU interface which does not specifically represent any physical device but which is provided to the VM 130 and which interacts with the driver 140 at the VM 130.

So, again from the point of view of the VM, a memory address translation is carried out by the "SMMU" which the VM accesses via the emulated interface 150. In fact, the translation (or at least a stage 2 operation of that translation) is carried out by the SMMU 250 under the control of the HV based at least in part on information received by the HV via the emulated interface 150.

The SMMU function has an associated event queue (to which the SMMU writes data to indicate that an "event" such as a translation fail (transaction successes are not normally notified as events to avoid a proliferation of communications) has taken place, so that the information can be read from the event queue by software associated with the system requesting the translation. The SMMU function also has a command queue into which software associated with the system requesting a translation can insert commands to instruct the SMMU what to do. For the real SMMU, these two queues are the event queue 210 and the command queue 220, both under the control of the HV. Importantly, the event queue 160 and the command queue 170 are provided to the VM as part of the emulation by the HV 190. They are not the actual event and command queues of the SMMU 250, but appear to be so from the point of view of the VM 130. The HV 190 controls the writing of information into the event queue 160 and the reading of information from the command queue 170. In an example, the way in which this can be done is as follows.

When an event is written by the physical SMMU to the event queue 210, the HV detects whether that event is relevant to a particular VM (such as the VM 130) and, if so, writes that event into the event queue 160 of that VM 130. This could be a direct and literal copy, or could involve a translation process mapping an SMMU event identifier to another event identifier relevant to the VM. Similarly, for the command queue 170 of a VM, if the HV detects that a command is written to the command queue of a VM, the HV writes that command to the command queue 220 of the SMMU. These processes are relevant to the discussion below.

The page tables 180, 230 are provided for a so-called page table walk process carried out as part of stage 1 or stage 2 (respectively) of a two stage (VA to IPA, IPA to PA) MMU translation process.

The configuration table 240 stores information relating to a current configuration of the SMMU 250 and of the emulated SMMU 200. An aspect of its use which is relevant to the present techniques will be discussed below.

Figure 5:
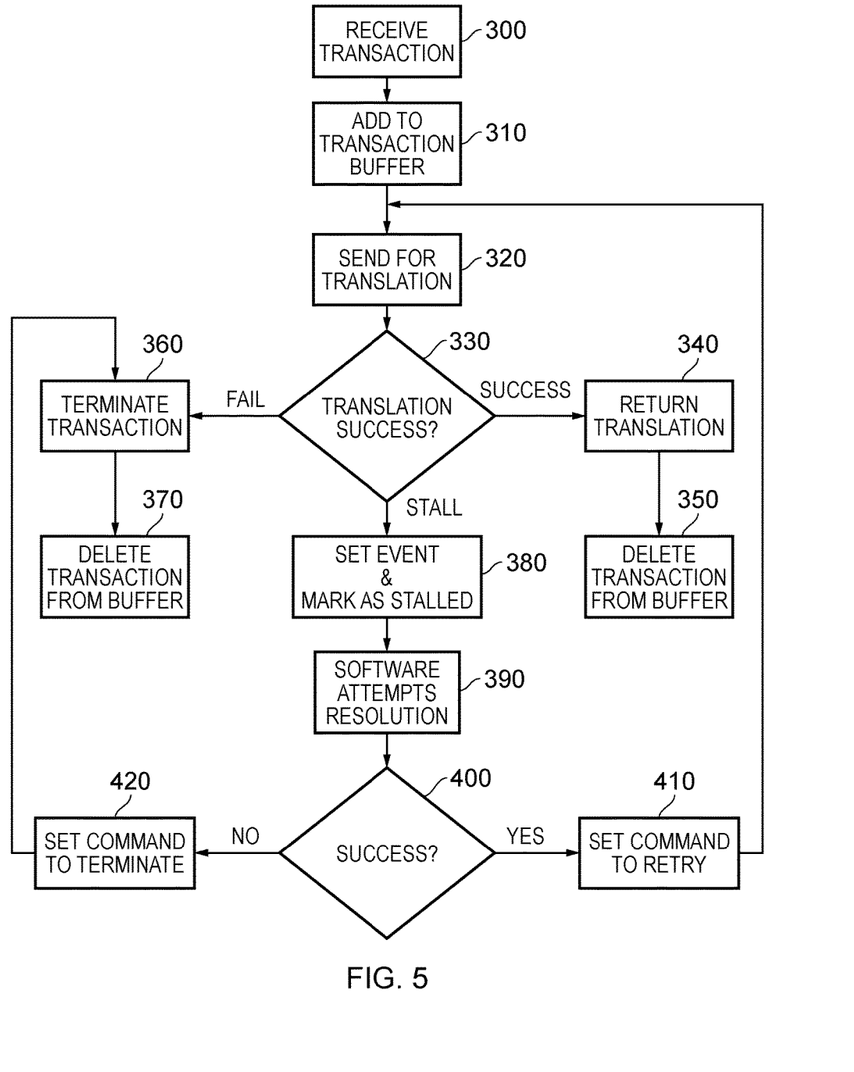
FIG. 5 is a schematic flow chart of a transaction handling process.

FIG. 5 is a schematic flow chart illustrating operations relating to a translation transaction (an instance of a request for translation from a VA to a PA by a device operating under the control of a VM).

At a step 300 the SMMU 60 receives the transaction from the respective device, as an example of initiating or handling a transaction for translation of a guest system memory address to a host system physical address in response to a transaction request from a device overseen by a guest system for access to system memory at that guest system memory address.

At a step 310, the SMMU adds the transaction to a transaction buffer, involving (for example) storing identification information relating to that transaction including at least data identifying the device which requested the transaction. Transactions from various different devices are added to the buffer when they are received, and they are dealt with in an order of dealing with transactions established by the SMMU (which may be an order of receipt of the transactions, but may be another order). At the appropriate stage, at a step 320 a particular transaction is sent for translation. In due course, a translation response is provided by the SMMU.

A step 330 represents a decision point based upon the nature of the translation response.

If the translation was a success, which is to say the VA to PA translation was completed without any error codes or other problems (examples of such problems being discussed in more detail below) then control is passed to a step 340 at which the required translation is returned such that the required memory access corresponding to that PA is carried out and the corresponding transaction is deleted from the transaction buffer at a step 350. Here, the term "returned" covers situations such as one in which a transaction, after a successful translation, progresses downstream in order to form or provide a read/write address for a memory access. So the term "returned" does not necessarily indicate that the translation is passed back to the requesting device, but rather that it is supplied to a next process as a successful output of the translation process.

If, at the step 330, the translation is such that it has generated an error code indicating a translation failure, then optionally an event indicating this status is written to event queue 210 (and, as discussed above, written from there to the event queue 160 of the relevant VM), and then control is passed to a step 360 at which that transaction is terminated and, at a step 370 the transaction is deleted from the transaction buffer.

A third category of outcomes is provided from the step 330, in that a transaction may be considered to have "stalled". A stalled translation is one which has an error type of a particular subset of error types, such that although the transaction has initially failed, it is potentially resolvable. So, in relation to stalled transactions, control does not pass to the step 360 but instead passes to a step 380 at which an event is written to the event queue 210 (and, as discussed above, written from there to the event queue 160 of the relevant VM) to prompt some remedial action in respect of that transaction, and the transaction is marked in the transaction buffer as "stalled".

In the case of a detected stalled transaction, as described below, a handling process is followed involving providing information indicative of the translation error condition to the guest system overseeing the device which requested the transaction; receiving a command from the guest system in respect of that transaction; and validating the received command for execution, by comparing the stored identification information for that transaction with at least the identity of the device identified by the command. For a stalled transaction, being a transaction incurring an error condition which is potentially resolvable by the guest system overseeing the device which requested the transaction, the following steps may be performed: (i) storing identification information relating to that transaction including at least data identifying the device which requested the transaction; (ii) providing information indicative of the translation error condition to the guest system overseeing the device which requested the transaction; and (iii) deferring continued handling of the stalled transaction until a subsequent command is received from that guest system relating to the stalled transaction. The deferring step may comprise deferring continued handling of the stalled transaction until a subsequent command is received from a guest system and that command is validated, for example by comparing the identity of the device providing the command with the stored identification information relating to that transaction.

At a step 390 software associated with the virtual machine 130 attempts a resolution of the problem which lead to the transaction being stalled. If, at a step 400, this attempted resolution is a success (or at least is determined by the software which attempted the resolution to have been a success to the extent that it is appropriate to retry the transaction) then at a step 410, a command is written to the command queue 170 to retry the transaction and, as discussed above, is written to the command queue 220 of the SMMU 250. Control, in respect of that transaction, then returns to the step 320 to attempt translation. If, however, at the step 400 the attempted resolution of the stalled transaction is deemed to be a failure, then at a step 420 a command is written to the command queue 170 (and written to the command queue 220) to terminate the transaction and control passes to the step 360.

As noted above, in FIG. 4 both the VM and the HV have respective event queues and command queues. The way in which messages are transferred so that they are acted upon by the correct one of the VM and the HV were discussed briefly above and will be discussed in more detail below.

Figure 6:
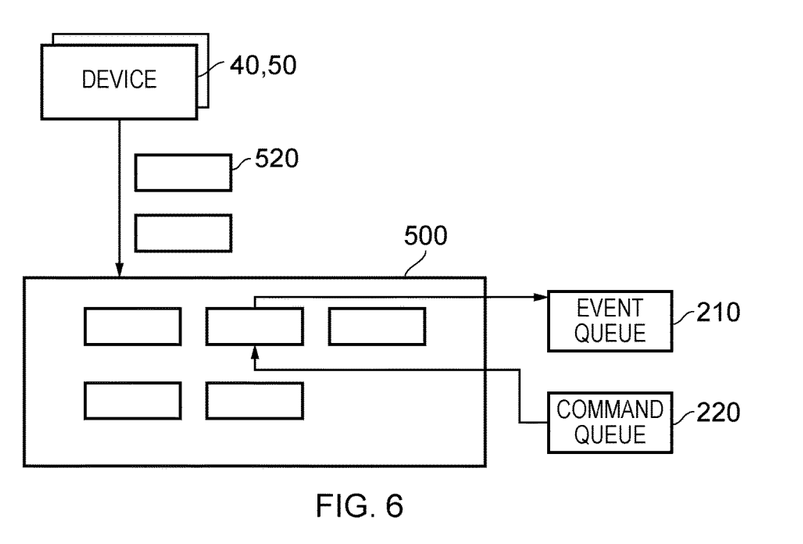
FIGS. 6 and 7 schematically illustrate transaction buffers.
Figure 7:
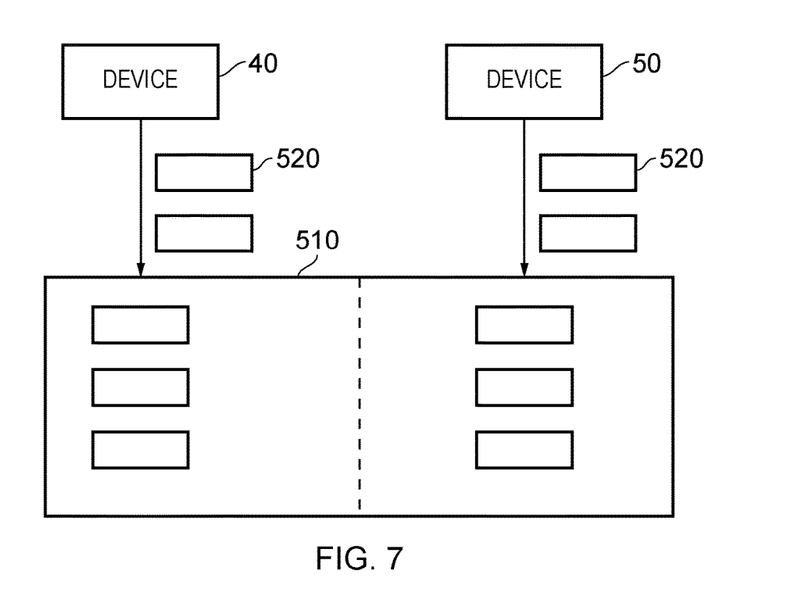

FIGS. 6 and 7 schematically represent variants of a transaction buffer 500 (FIG. 6), 510 (FIG. 7).

In each case, transactions 520, representing requests or requirements for translation of VAs by a device 40, 50 are received by the SMMU emulator 200 of the HV and are stored in the transaction buffer. Each transaction as received from a device comprises at least a VA for which translation is requested. The storage of the transactions in the transaction buffer corresponds to the step 310 in FIG. 5.

As mentioned above, each device 40, 50 has an associated "stream ID" which, in at least some examples, is unique (or at least unique amongst the cohort of devices connected to the system) to that particular device. The stream IDs are associated with devices in the present examples, though in other examples the stream IDs could be associated with VMs. A mapping between stream IDs and devices may be maintained as a stream table by the HV. (The mapping could be permanently established, so avoiding the need for a stream table, but this would be a rather inflexible arrangement).

In FIG. 6, the transactions 520 are stored in the transaction buffer such that each stored transaction can be individually accessible and such that each stored transaction has associated with it (for example, as part of the stored data relating to that transaction) the stream ID of the device from which the transaction was received. Two types of data flow are also shown schematically in FIG. 6, which is that in the case of either a failed transaction or a stalled transaction, data relating to that transaction can be written to the event queue 210, and in some circumstances such as those corresponding to the steps 410, 420 of FIG. 5, data relating to that transaction can be written to the command queue 220 so as to have an effect on the execution of that transaction.

An alternative arrangement is shown in FIG. 7, in which the transaction buffer 510 is partitioned either physically or logically, such that transactions received from each device are stored in a respective separately addressable area of the transaction buffer. In this instance, the need to store an explicit record of the stream ID can be avoided, but the association of the stream ID with the record corresponding to each transaction is maintained.

Figure 8:
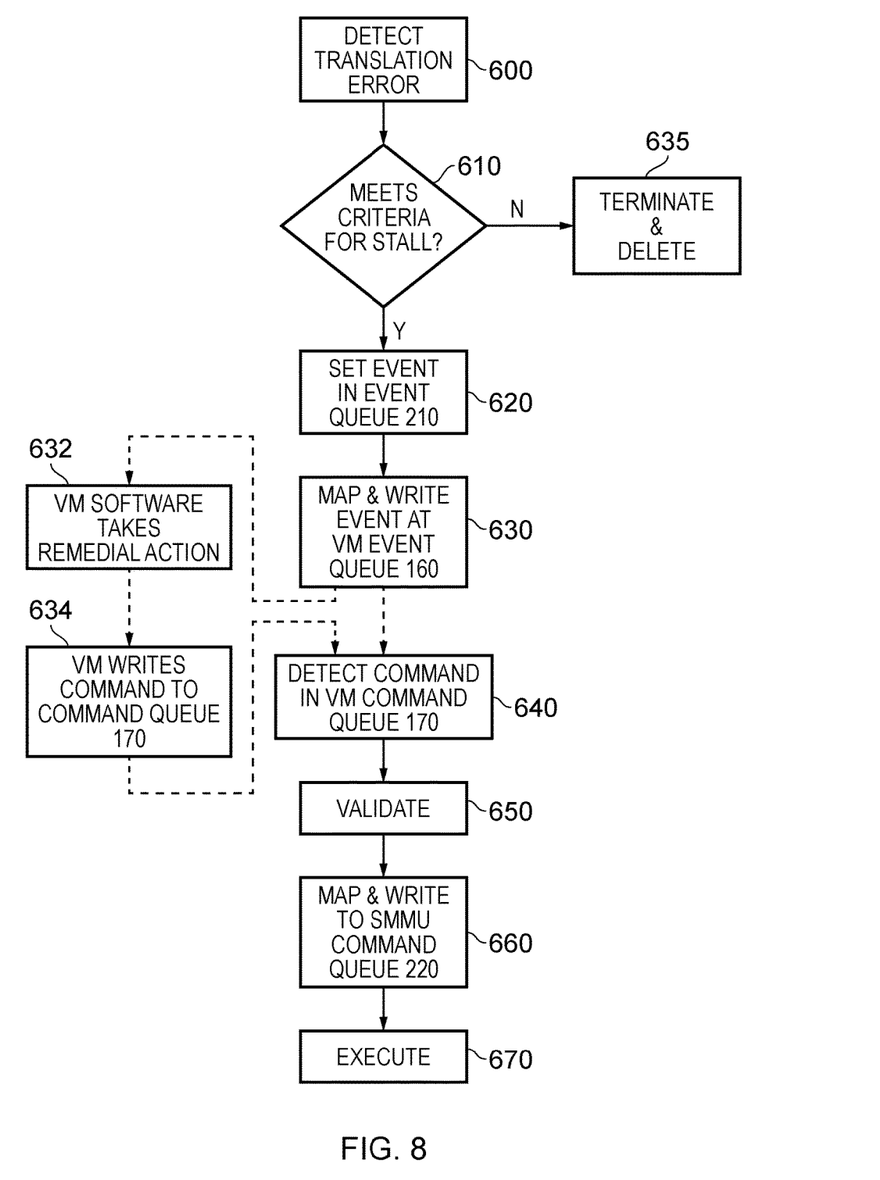
FIG. 8 is a schematic flow chart of a stall handling process.

FIG. 8 is a schematic flow chart covering some of the processes shown in FIG. 5, starting at part of the operation of the step 330, namely that part which does not refer to a successful transaction.

At a step 600, a translation error is detected. As discussed above, a translation error could be a "fatal" translation error classified as a fail and causing control to pass to the step 360 in FIG. 5. Or the translation error could be classified as a "stall". As mentioned above, a stalled transaction is one which is potentially resolvable, but in terms of a concrete test for such a status, at a step 610, the nature of the failed transaction is compared with criteria used to define whether the transaction is stalled. If the transaction meets the criteria for a stall, control passes to a step 620. If not, control passes to a step 635 which schematically represents the route indicated by the steps 360, 370 in FIG. 5.

There can be various reasons for a transaction to fail. Only some of these may be potentially resolvable and therefore suitable for a transaction "stall" status. Other types of transaction failure may lead directly to a failure notification (the step 635) rather than the stall processing. So, the criteria used in the step 610 may be a subset, of a set of error types, associated with a transaction stall. Examples of such a subset include:

i. an address size fault
ii. an access fault
iii. a translation fault
iv. a permission fault If the detected fault is in the subset of faults (such as the subset listed above) then the transaction is considered as "stalled" at the step 610. If the detected fault is a fault which is not in the subset of faults, then the transaction is considered as "failed" at the step 610.

Accordingly this provides an example of detecting an error type, from a set or two or more error types, in respect of a translation error condition; for a first subset of error types, terminating the transaction; and for error types other than those in the first subset of error types, performing the stalled transaction handling process.

At the step 620, an event is written by the SMMU to the event queue 210, and the HV detects the presence of the newly written event. Then, at a step 630 the HV maps that event to a corresponding VM event and writes the event from the event queue 210 to form a corresponding event in the event queue 160 of the VM 130. A reason for the mapping is to make it appear to the guest system that the guest system is interfacing directly with hardware rather than via the HV.

Note that the HV 190 may, in some circumstances, not in fact write a particular event (relating to a stalled transaction) to the event queue 160 of the VM 130. For example, if the current fault is one which the HV can (and should) deal with, for example some types of faults associated only with stage 2 translation and on which the request from the device overseen by the VM 130 has no influence, then the HV can deal with the fault itself. Although such faults may be marked as stalled while the HV attends to the fault, there is no need to involve the VM 130 or subsequently to validate (see below) a command relating to resolution of the fault. However, the remainder of this description will relate to faults which are notified to the VM 130 for potential resolution.

The event in the event queue 160 of the VM 130 prompts the VM 130 to take some sort of remedial action over the problems with the transaction. This is represented in FIG. 8 by a step 632, and at a step 634 the VM 130 writes a command to the command queue 170 of the VM 130. Note that the steps 632, 634 are shown for clarity of the explanation but, in contrast to the remainder of FIG. 8, are steps which are carried out at the VM 130 rather than by the HV 190 or SMMU 250.

In terms of the control flow for the HV 190, control passes from the step 630 to a step 640 at which the HV detects the presence of a command in the VM command queue 170 and, at a step 650 the HV and SMMU validate the command. The validation process will be discussed further below. For a successfully validated command the HV maps that command to a corresponding SMMU command and writes it to the SMMU command queue 220 at a step 660. The SMMU 250 detects the presence of a command in the command queue 220 and executes the command.

The interaction between the steps 650, 660, 670 can vary from implementation to implementation. For example, the HV could validate the command before writing it to the SMMU command queue 220, so that only validated commands are written to the command queue 220. Alternatively, the command could be written to the SMMU command queue 220 but the SMMU itself inhibited from executing the command until the HV 190 and the SMMU have validated the command for execution. In either case, the outcome is that only those commands which have been validated at the step 660 are executed by the SMMU 250.

Figure 9:
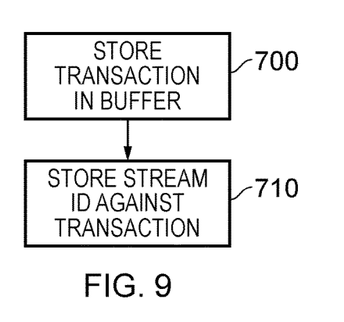
FIG. 9 is a schematic flow chart of a data storing process.
Figure 10:
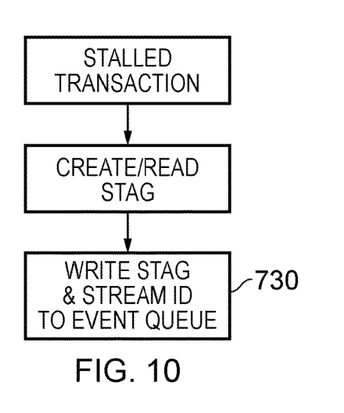
FIG. 10 is a schematic flow chart of an event creation process.
Figure 11:
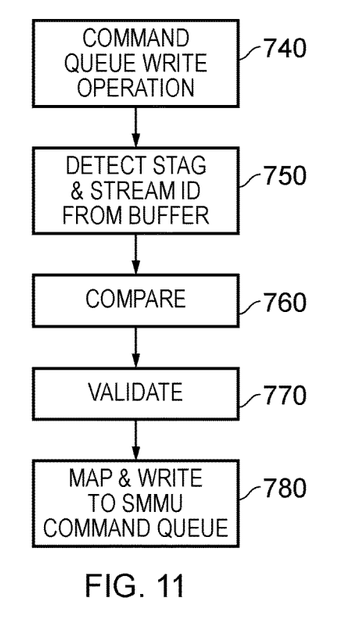
FIG. 11 is a schematic flow chart of a validation process.

FIGS. 9 to 11 are schematic flow charts representing particular portions of the processes described above.

In FIG. 9, the initial storage of a transaction in the transaction buffer 500, 510 (which refers to the step 310 of FIG. 5) comprises storing the transaction in the transaction buffer 500, 510 (at a step 700), and storing or retaining the stream ID against that transaction, at a step 710. As discussed above, the stream ID can be stored explicitly as part of an entry in the transaction buffer associated with that transaction, or can be stored implicitly by selecting which portion of the transaction buffer the transaction is stored in.

FIG. 10 relates to the step 380 of FIG. 5 in the case of a stalled transaction. A so-called "stall tag" (STAG) is created or read from data stored in the transaction buffer 500, 510. In the case of some implementations of a transaction buffer 510, the data already stored in the transaction buffer (or indeed the location of the transaction in the buffer) may correspond to that required as the STAG. In other implementations, the STAG is derived from data stored in the transaction buffer. Examples of the STAG will be given below. Then, at a step 730, at least the STAG and the stream ID of the device which originally issued the transaction are written to the event queue 210 as part of an event relating to that stalled transaction.

The STAG can provide various types of data about the transaction. A basic requirement is that the STAG allows an individual transaction to be located in the transaction buffer, either on its own or in cooperation with the stream ID. This provides an example of identification information comprises information identifying that transaction amongst other transactions being handled by the SMMU.

So, in examples, the STAG could provide a transaction identifier, such as a counter or other value assigned to that transaction as part of the entry of that transaction into the transaction buffer. The assigned value does not need to be unique across the whole period or extent of operation of the system, but simply unique amongst those transactions currently held in the transaction buffer or a sub-section of the transaction buffer. When a transaction is removed from the transaction buffer (for example, at the steps 350 or 370 of FIG. 5) then the STAG associated with that transaction could be made available to be allocated to another newly received transaction. In example arrangements the transaction identifier could be stored as part of each respective transaction entry in the transaction buffer, so that when the SMMU needs to locate a particular transaction in the transaction buffer, it does so by comparing the transaction identifier of the particular transaction with the stored transaction identifiers in the transaction buffer.

In other examples, the STAG also provides a transaction identifier of the general type discussed above, but the storage of the transaction identifier is implicit so that the transaction identifier actually forms all or part of an address defining where, in the transaction buffer, that transaction entry is stored. This can apply even if each entry in the transaction buffer occupies more than one byte; the transaction identifier can point (for example) to the start of each such entry. For example, if each entry in the transaction buffer occupies (say) 16 bytes, the transaction identifier could be used as all but the four least significant bits of an address of that entry in the transaction buffer, so that (for example) the address of the first byte of the corresponding entry is [transaction identifier]0000. In this way, when the SMMU needs to locate a particular transaction in the transaction buffer, it does so by addressing the transaction buffer using (at least in part) the transaction identifier of that particular transaction.

So, as discussed, a function of the STAG is to provide the transaction identifier allowing a transaction (identified by such an identifier) to be located in the transaction buffer amongst other entries in the transaction buffer. The STAG may provide other information. Or, other information may be provided as part of an entry, in the transaction buffer, identified by the STAG.

Note that in the example of FIG. 7, a combination of a transaction identifier and a stream ID identifies an individual transaction. In FIG. 6, a simple transaction identifier could in principle identify each individual transaction in the transaction buffer. Or a combination of a transaction identifier (operating separately for each stream ID) and the stream ID could be used to identify a specific transaction.

Examples of other information which may be associated with an entry in the transaction buffer (whether or not included as part of the STAG) include one or more of the following:

i. the stream ID, or another identifier, indicating the device and/or the VM from which the transaction originated. In example embodiments, the stream ID is used, to indicate the device from which the transaction originated;
ii. the VA for which translation was requested;
iii. the type of memory access relating to the transaction (for example, read, write or instruction fetch).

The step 730 mentioned above relates to providing an "event" in the event queue 210 of the HV. The "event" is a set of information which can then be used (for example, by software associated with the VM 130, either to attempt a resolution of the issue which led to the transaction being stalled, or to determine that no resolution is in fact possible. An example of the data which may be provided as part of such an event is as follows. Here it is assumed, purely for the purposes of this description, that the STAG simply provides the transaction identifier function discussed above.

i. the STAG;
ii. the stream ID of the originating device;
iii. a fault code indicating a type of translation fault (four example types of translation fault which give rise to stalled transactions in the present examples were discussed above—these can be identified in the event data by a respective two-bit code);
iv. the VA for which translation was requested;
v. the type of memory access; and
vi. a flag indicating whether the fault occurred at a stage 1 or a stage 2 translation.

The provision of the STAG and the stream ID therefore gives an example of providing information identifying the transaction and information identifying the guest system (or, more particularly, identifying the device) which requested the transaction. In example embodiments, the data identifying the device which requested the transaction may comprise data identifying a device, associated with the guest system, which initiated the request for access to system memory associated with that transaction.

Providing the STAG and some or more of the other data discussed above as part of the event added to the event queue provides an example of generating transaction identifier data comprising: an identifier of the system which requested the transaction, an identifier of the transaction amongst other transactions being handled by the host system, data defining an error type, a guest system memory address relating to the transaction, and data defining a type of memory access requested by the guest system; and providing the transaction identifier data to the guest system overseeing the device which requested the transaction.

These data are passed to the event queue 210 of the HV. The HV writes the event to the respective event queue 160 of the appropriate VM 130 (at the step 630 described above), representing the event queue associated with the guest system overseeing the device which requested the transaction. In example arrangements the HV detects which VM 130 is appropriate by detecting the stream ID associated with the event and identifying the corresponding VM from the device ID in the stream table and a mapping held by the HV of VM to device. This two-stage process provides an example of adding the transaction identifier data to an event queue associated with the host system; and copying the transaction identifier data from the event queue associated with the host system to the event queue associated with the guest system overseeing the device which requested the transaction.

In some example instances, the HV simply copies the event from the event queue 210 to the event queue 160 of the appropriate VM 130. In other instances the HV may modify the data associated with the event prior to copying, so that a modified version of the event data is written to the event queue 160 of the appropriate VM 130. For example, the HV may delete the flag indicating whether the fault occurred at a stage 1 or a stage 2 translation, if the arrangement is such that the VM 130 is unaware that two-stage translation is being used. In other examples, the HV may map the fault code to one of a different set of fault codes relating to matters which can be addressed by the VM 130. For example a stage 2 translation fault (in which for example the IPA attempts to access a forbidden address) can be forwarded to a guest VM as an external abort record (for example, an external abort on a page table walk) which tells the guest system that a translation step such as a page table walk caused an access which was illegal given the bounds of the VM's permissions. As a further example of this type of technique, the HV may maintain stream IDs in a form which allows many devices to be distinguished by the HV (for example, stream ID 2991 and stream ID 12920), whereas a VM may maintain a much simpler stream ID system which only has to distinguish between devices overseen by that VM (such as stream IDs 1 and 0). The HV can maintain a mapping between these versions of the stream ID so that the version of the stream ID which is relevant to the VM is substituted into or out of the data associated with the event as appropriate. Overall, the mapped commands are arranged so that the guest OS does not need to be modified to work with the HV (note that the guest OS is unaware of the presence of the HV). The VM 130 attempts to resolve the issue, or alternatively determines that the issue is unresolvable. Software associated with the device which originated the transaction then places a command onto the command queue 170. The command can include (for example) at least the following information:
  i. the STAG
  ii. the stream ID
  iii. a resolution code, for example specifying "retry" or "abort". Note that the "abort" code may result from an attempted but failed resolution by the VM 130, or may result from a simple determination, by the VM 130, that the issue is unresolvable.

In general, the command can include some or all of the transaction identifier data provided as part of the event notification. The command from the guest system can therefore comprise information identifying the transaction and/or information identifying the device which requested the transaction.

The HV and SMMU validate the command and the HV writes the command as discussed above. This process may comprise detecting a command in a command queue associated with the guest system overseeing the device which requested the transaction; and copying the command from the command queue associated with the guest system overseeing the device which requested the transaction to a command queue associated with the SMMU. The validation process may comprise comparing the identifier of the device which requested the transaction in the transaction identifier data in the command from the guest system with the stored identification information. The validation process may comprise inhibiting or preventing execution of the command if the stored identification information for that transaction does not correspond to the device identified by the command. The validation process will be described in more detail below.

FIG. 11 relates to operations of the hypervisor and the SMMU as an example of the validation step 650 of FIG. 8.

At an overview level, it is the guest system or VM (overseeing the device which initiated the stalled transaction) which issues a command. In response, the HV checks that the correct VM is issuing the command, which is to say that the VM overseeing the device specified in the command is issuing the command. The SMMU starts or initiates its handling of the matter and checks that the device specified in the command matches the device or stream ID specified in the originally stored transaction information.

A step 740 corresponds to the step 640 of FIG. 8 in which a write operation to the command queue 170 is detected. The written command (and indeed the initial command written to the VM command queue) comprise the STAG and also indicate either explicitly or implicitly the stream ID of the device which provided that command.

At a step 750, the SMMU detects the STAG from the command. The SMMU accesses the transaction buffer using the STAG, so that the SMMU identifies a single transaction in the transaction buffer corresponding to that STAG. As discussed above, this may involve searching the transaction buffer for a transaction having the same STAG, or may involve using the STAG as (at least a part of) an address to access the transaction buffer.

The transaction buffer stores or otherwise provides, in respect of each transaction held in the transaction buffer, the stream ID of the device from which that transaction originated.

The HV therefore checks that the stream ID specified in the command is that of a device overseen by the guest system originating the command. The SMMU detects the stream ID relating to the corresponding transaction from the transaction buffer 500, 510 and, at a step 760 compares at least the stream ID from the transaction buffer with the stream ID of the device specified by the command relating to that transaction.

If the stream IDs match then the command is validated at a step 770 (corresponding to the step 660 of FIG. 8) for execution.

But if not, then the command is not validated and is either ignored or deleted.

A step 780 corresponds to the step 660 discussed above at which (in the case of a validated command) a corresponding command is written to the SMMU command queue 220.

The validation test therefore (in these examples) includes a simple comparison of two versions of a stream ID, one from the received command and one being a version stored with the original entry in the transaction buffer, which two versions should exactly match if the same device that originated the stalled transaction is overseen by the guest system now attempting a retry or an abort of that transaction. Similarly, the stream ID associated with the transaction information should match the stream ID of the device specified by the command. These tests can help to avoid one guest affecting a transaction originated by another guest, either as a result of an error or as a potential security issue such that one device attempts fraudulently or otherwise inappropriately to affect a transaction initiated by another device.

In embodiments, the validating comprises verifying that the guest system originating the command is overseeing the device identified by the command.

There is no need for the HV to decode the STAG or to validate the STAG. The STAG can therefore be "opaque" to the HV, such that its exact value or significance does not matter to the HV apart from the fact that it identifies a particular transaction. There is also no need for the HV to maintain data defining the order in which transactions stalled.

Note that as discussed above, the processes of (a) writing the command to the SMMU command queue and (b) validating the command for execution may be carried out in either order, so that, for example, only already-validated commands are written by the HV to the SMMU command queue 220, or a command written to the SMMU command queue are inhibited from being executed until and unless the command has been validated. In example embodiments, only validated commands are written to the SMMU command queue.

Figure 12:
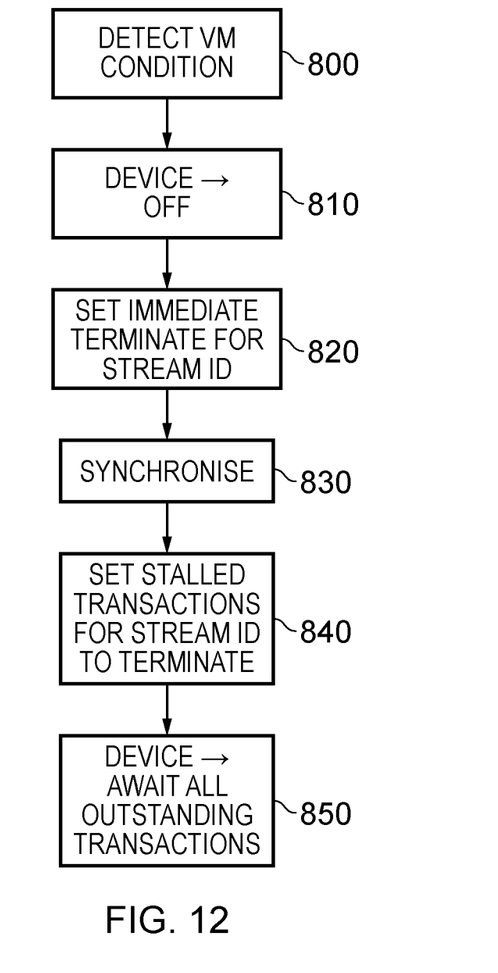
FIG. 12 is a schematic flow chart of a stalled transaction clean-up process.

FIG. 12 relates to a schematic flow chart of operations carried out if a VM is to be shut down.

The arrangements of FIG. 12 are potentially useful in the case of an SMMU which has a stalling fault model in which faulting transactions can be held/stalled pending later software resolution, which makes use of a command that resumes (retries) or terminates (aborts) the processing of a stalled transaction.

In normal operation, a stalled transaction is dealt with by one resume/terminate command. As a stalled transaction consumes an SMMU resource, transactions should not be left stalling indefinitely otherwise system may lock up. When an SMMU is used to assign control of a device to a VM, the device might be expected to be in an unpredictable state when it comes time to terminate the VM and reclaim resources. In such a situation, in example embodiments such as those discussed in connection with FIG. 12, the HV can conservatively assume that stalled transactions might exist (from previous faults that were not correctly resumed) and these should all be cleaned up (for example, deleted or removed), or otherwise the system may deadlock.

An option may be for the HV to track all stalling faults recorded to software (during conveying these faults to the VM). A list of outstanding stalls would be maintained, cross-checked against VM resume/terminate commands to resolve the stalls. When a VM is to be terminated, the list would indicate outstanding stalls that have not been acknowledged/individually terminated, and the HV would need to issue individual resume/terminate commands itself on a transaction-by-transaction basis. Potential disadvantages to this approach include extra complexity in software and additional ongoing processing requirements.

Example embodiments address these problems with a command or process, corresponding to a step 840 to be discussed below), that terminates (or causes to be set to terminate) all outstanding stalls relating to a given stream ID (device) whether or not they have been recorded to software and without having to know the details of which individual stalls might be present. This means the HV has no requirement to track individual outstanding stalls, as they do not need to be individually matched to an individual terminate command. This can simplify cleanup after initiation of VM shutdown with assigned devices (a safety/isolation-critical path). Also, as traffic can't be guaranteed to be quiescent on cleanup, the HV can shut down a guest device stream in a race-free way with this process, by configuring the device to stop issuing new transactions, and setting any newly-arriving transactions are immediately terminated instead of stalling. The set of stalled transactions for the stream is now constant. The Hypervisor terminates the entire set of stalled transactions. As no new transactions can stall, it is guaranteed that no stalls will remain. The HV instructs the device(s) to wait for all outstanding transactions to terminate. Note that the termination process will terminate a stalled transaction whether or not the stall fault was reported to software.

Turning to FIG. 12, a VM can be shut down for various reasons. The VM itself may decide to close its process. Alternatively, the VM could crash. In a further alternative, the HV could take a decision to close a VM because of some inappropriate action by the VM, for example attempted operation in breach of its operational privileges. In any of these cases, it is recognized in the present disclosure that the closure of a VM could (in the absence of measures to address this potential issue) leave a number of stalled transactions in the transaction buffer 500, 510 with no opportunity then for the transactions to be subsequently deleted. This is because deletion of the stalled transactions depends upon receiving a command from the originating VM, but in the present situation the particular VM, which would need to provide a command to take further action over those transactions, no longer exists.

At a step 800, the HV 190 detects a VM "condition". Here, as discussed, the condition could be that the VM is voluntarily closing, that the VM is involuntarily closing by means of a crash, that the HV has decided in respect of that VM to close the VM, and so on. In general, the VM condition is one that indicates that the VM has at least initiated (or is subject to at least the initiation of) a closure process relating to that guest system. For example, the closure process may comprise any one of: the host system causing closure of the guest system; the guest system closing; and the guest system suffering an operational failure.

A series of steps is then carried out to provide a clean closure of the VM with respect to pending SMMU transactions. Here, the term "clean" is used to indicate that the closure can take place without leaving indefinitely unresolved stalled transactions. Assume that the VM under discussion oversees one or more devices.

At a step 810, the HV either itself shuts down (or instructs the VM to shut down) (up to all of) the one or more devices associated with that VM, so that they cannot issue any further transactions for memory translation. The step 810 provides an example of, prior to cancelling any currently stalled transactions for that guest system for which a command has not yet been received from the corresponding guest system, the step of: inhibiting one or more devices from issuing any further transactions.

Then, at a step 820, the HV sets the configuration table 240 to a configuration which indicates that any incoming transactions for the stream ID relating to the device or devices in question will not be stored in the transaction buffer 500, 510 but will be immediately terminated. The steps 810, 820 can be carried out in either order. The step 820 provides an example of prior to cancelling any currently stalled transactions for that device or those devices for which a command has not yet been received from the corresponding guest system, setting a termination rule to terminate any transactions newly received by the host system from one or more devices overseen by that guest system.

A step 830 applies a so-called "synchronize" operation which ensures that the setting applied to the configuration table by the step 820 take effect across all incoming transactions.

Then, at a step 840, the HV sets all currently stalled transactions for the stream ID or stream IDs in question to be terminated. This could involve terminating those stalled transactions instantly or simply setting them to terminate in due course. This provides an example of—in response to initiation of the closure process—initiating cancellation of (or indeed cancelling) any currently stalled transactions for one or more devices overseen by that guest system for which a command has not yet been received from that guest system. As mentioned, this process is carried out by stream ID, so that it provides an example of detecting any currently stalled transactions for that device or devices for which a command has not yet been provided by that guest system, which have stored identification information corresponding to one or more devices overseen by the guest system which a closure process has been initiated; and initiating cancellation of all of the detected transactions. For example, one or more stream IDs may correspond to a guest (VM), with the correspondence being provided by the stream table.

At a step 850, the HV instructs the VM and the device(s) in question to await a response in respect of all outstanding transactions. The step 850 provides an example, in response to initiation of the closure process, of instructing one or more devices overseen by the guest system to wait for a response to any outstanding transactions.

Accordingly, in at least some embodiments, the host system provides an SMMU, a transaction buffer, error handling logic, a detector and cancellation logic.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the CPU 20) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method of operation of a host data processing system which provides a virtual operating environment for one or more guest data processing systems, the method comprising:
   initiating a transaction for translation of a guest data processing system memory address, being a memory address of one of the one or more guest data processing systems, to a host system physical address in response to a transaction request from a device overseen by the one of the one or more guest data processing systems for access to system memory according to the guest data processing system memory address;
   storing identification information relating to each transaction including at least data identifying the device which requested the transaction;
   for a stalled transaction, being a transaction incurring an error condition which is potentially resolvable by the one of the one or more guest data processing systems overseeing the device which requested the transaction:
      (i) storing identification information relating to the transaction including at least data identifying the device which requested the transaction;
      (ii) providing information indicative of the translation error condition to the one of the one or more the guest data processing systems overseeing the device which requested the transaction; and
      (iii) deferring continued handling of the stalled transaction until a subsequent command is received from the one of the one or more guest data processing systems relating to the stalled transaction;
   detecting initiation of a closure process relating to a guest data processing system to be closed; and
   in response to initiation of the closure process, initiating cancellation of any currently stalled transactions for devices overseen by the guest data processing system to be closed for which a command has not yet been received from the guest data processing system to be closed.

2. A method according to claim 1, comprising, prior to cancelling any currently stalled transactions, the step of:
   setting a termination rule to terminate any transactions newly received by the host system from one or more devices overseen by the guest data processing system to be closed.

3. A method according to claim 1, comprising, prior to cancelling any currently stalled transactions, the step of:
   inhibiting one or more devices overseen by the guest data processing system to be closed from issuing any further transactions.

4. A method according to claim 1, comprising the step of:
   in response to initiation of the closure process, instructing one or more devices overseen by the guest data processing system to be closed to wait for a response to any outstanding transactions.

5. A method according to claim 1, in which the step of initiating cancellation comprises cancelling any currently stalled transactions for devices overseen by the guest data processing system to be closed for which a command has not yet been received from the guest data processing system to be closed.

6. A method according to claim 1, in which the step of initiating cancellation comprises:
   detecting any currently stalled transactions which have stored identification information corresponding to a device overseen by the guest data processing system to be closed and for which a closure process has been initiated; and
   initiating cancellation of all of the detected transactions.

7. A method according to claim 1, in which the closure process comprises any one of:
- the host system causing closure of the guest data processing system to be closed;
- the guest data processing system to be closed closing; and
- the guest data processing system to be closed suffering an operational failure.

8. A method according to claim 1, in which:
the deferring step comprises deferring continued handling of the stalled transaction until a subsequent command is received from one of the one or more guest data processing systems and the subsequent command is validated by comparing the identity of the device providing the command with the stored identification information relating to the transaction.

9. A host data processing system configured to provide a virtual operating environment for one or more guest data processing systems, the host data processing system comprising:
- a memory management unit configured to initiate a transaction for translation of a guest data processing system memory address, being a memory address of one of the one or more guest data processing systems to a host system physical address in response to a transaction request from a device overseen by the one of the one or more guest data processing systems for access to system memory according to the guest data processing system memory address;
- a transaction buffer configured to store identification information relating to each transaction including at least data identifying the device which requested the transaction;
- error handling logic configured, for a stalled transaction, being a transaction incurring an error condition which is potentially resolvable by the one of the one or more guest data processing systems overseeing the device which requested the transaction, to:
  - (i) store identification information relating to the transaction including at least data identifying the device which requested the transaction;
  - (ii) provide information indicative of the translation error condition to the one of the one or more guest data processing systems overseeing the device which requested the transaction; and
  - (iii) defer continued handling of the stalled transaction until a subsequent command is received from the one of the one or more guest data processing systems relating to the stalled transaction;
- a detector configured to detect initiation of a closure process relating to a guest data processing system to be closed; and
- cancellation logic, responsive to initiation of the closure process, configured to initiate cancellation of any currently stalled transactions for devices overseen by the guest data processing system to be closed for which a command has not yet been received from the guest data processing system to be closed.

10. A host data processing system operable to provide a virtual operating environment for one or more guest data processing systems, the host data processing system comprising:
- means for initiating a transaction for translation of a guest data processing system memory address, being a memory address of one of the one or more guest data processing systems, to a host system physical address in response to a transaction request from a device overseen by the one of the guest data processing systems for access to system memory according to the guest data processing system memory address;
- means for storing identification information relating to each transaction including at least data identifying the device which requested the transaction;
- means operable in respect of a stalled transaction, being a transaction incurring an error condition which is potentially resolvable by the one of the one or more guest data processing systems overseeing the device which requested the transaction, for:
  - (i) storing identification information relating to the transaction including at least data identifying the device which requested the transaction;
  - (ii) providing information indicative of the translation error condition to the one of the one or more guest data processing systems overseeing the device which requested the transaction; and
  - (iii) deferring continued handling of the stalled transaction until a subsequent command is received from the one of the one or more guest data processing systems relating to the stalled transaction;
- means for detecting initiation of a closure process relating to a guest data processing system to be closed; and
- means, responsive to initiation of the closure process, for initiating cancellation of any currently stalled transactions for devices overseen by the guest data processing system to be closed for which a command has not yet been received from the guest data processing system to be closed.

* * * * *